Sept. 1, 1959   M. R. ABATEMARCO ET AL   2,902,663
RECTILINEAR POTENTIOMETER AND IMPROVED HOUSING THEREFOR
Filed March 28, 1958   2 Sheets-Sheet 1
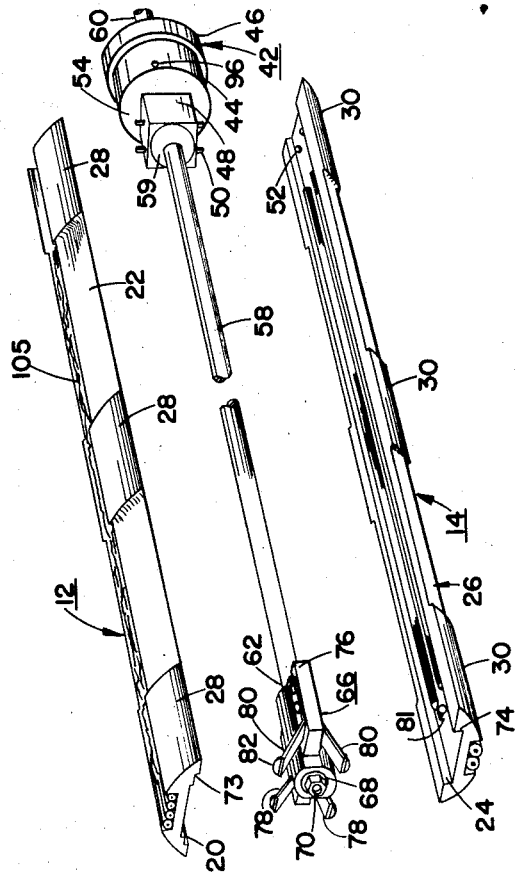
FIG. 1
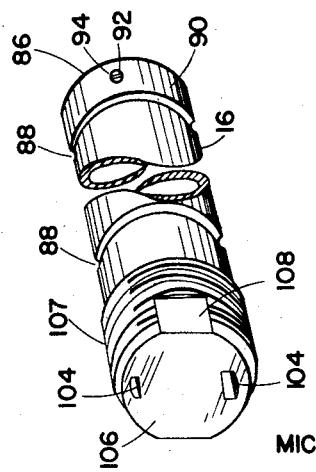
INVENTORS.
MICHAEL R. ABATEMARCO
MORRIS A. SHRIRO
BY   S. F. GUGGENHEIM

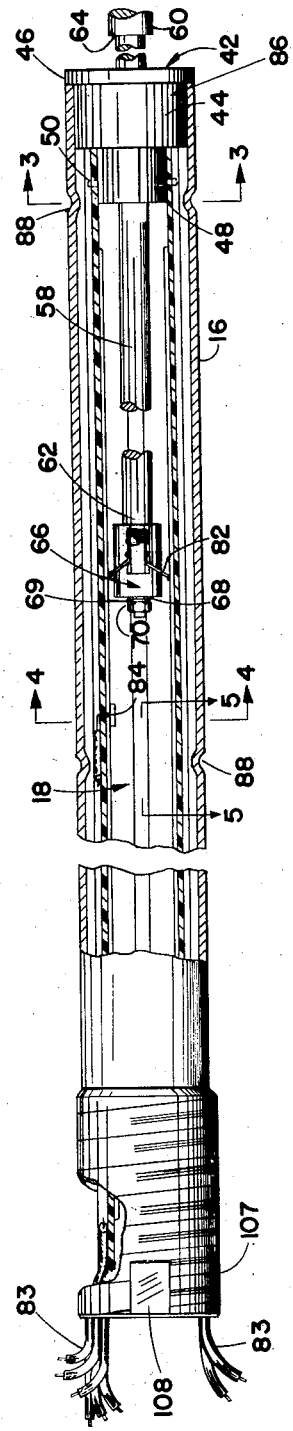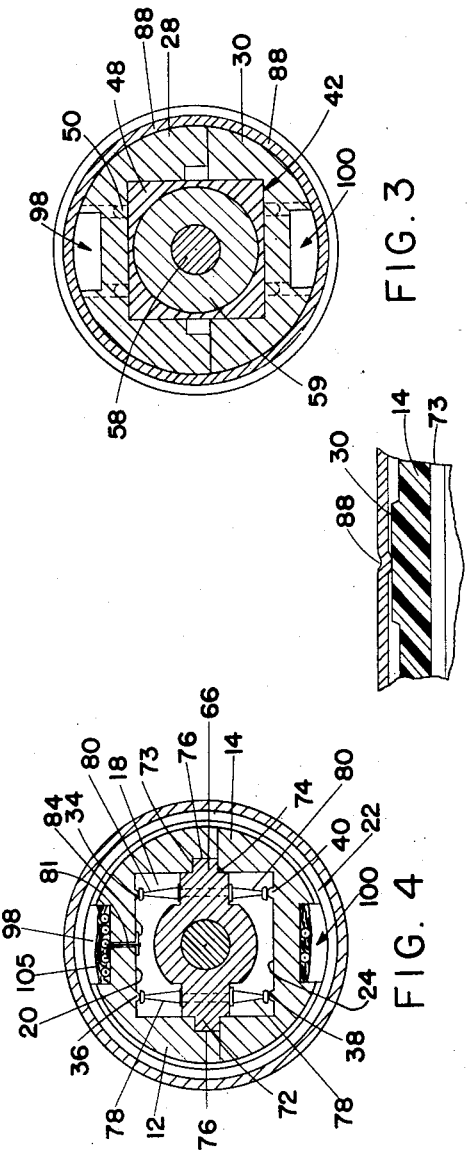
FIG. 2
FIG. 3
FIG. 4
FIG. 5
INVENTORS.
MICHAEL R. ABATEMARCO
MORRIS A. SHRIRO
BY   S. F. GUGGENHEIM

United States Patent Office 2,902,663
Patented Sept. 1, 1959

2,902,663

RECTILINEAR POTENTIOMETER AND IMPROVED HOUSING THEREFOR

Michael R. Abatemarco, Brooklyn, and Morris A. Shriro, Mount Vernon, N.Y., and S. Frederic Guggenheim, Teaneck, N.J.

Application March 28, 1958, Serial No. 724,653

8 Claims. (Cl. 338—176)

This invention relates to an improved rectilinear potentiometer of the precision class, adapted to be enclosed in a protective metallic shell, and more particularly to improved construction and assembly means for said potentiometer and said protective shell.

A rectilinear potentiometer may be employed to sense rectilinear motions and to convert these into corresponding electrical voltages. Such devices are used, for example, in controlling the extent or rate of translatory motion in automatic machine tools and servo systems. However, in practice, rectilinear potentiometers of a high degree of accuracy and linearity are usually limited in length to five or six inches, because of the high cost and great difficulty in manufacturing precision linear potentiometers especially where problems of shielding and shock mounting exist. A potentiometer may be employed in an automation process involving heavy equipment to monitor, for example, the motion of the table of a milling machine, or other reciprocating member. In such applications, the movement may be of the order of 20 to 30 inches. However, in the past, such long precision potentiometers were not practical to produce. As will be disclosed hereinafter, this invention makes feasible such units.

Furthermore, to construct precision potentiometers of the dimensions and applicability herein proposed would be extremely difficult by conventional means, since this would require complex machining operations to provide for the close tolerances of potentiometer elements and the mating external metal shell.

Perhaps a more important advantage of the potentiometer of this invention is that it is characterized by an extremely rugged construction and a compact shape rendering it suitable for use in difficult applications such as manned supersonic aircraft and missiles.

As will be hereinafter pointed out in detail the device of this invention is in the form of a cylinder free of any obstructions, thus making it simple to insert into a recess, as is often necessary for installation in such crowded devices as missiles.

A substantial part of the cost of producing precision potentiometers arises from the necessity for carefully testing the characteristics of the completed unit, making adjustments if required, and then retesting. In the conventional precision potentiometer the unit requires complete assembly prior to testing. It is not uncommon to employ as many as a dozen screws or other fasteners which have to be removed and then replaced in order to make a minor correction or adjustment in the internal mechanism so that the unit may conform with the specified standards. The apparatus of this invention overcomes these deficiencies in the prior art devices by permitting testing of a complete unit prior to final encasement in a protective housing.

In many applications high operating temperatures are encountered, which tend to cause unequal expansion in plastic and metal components of the conventional potentiometer, with the possibility of buckling of members or other distortion taking place. The apparatus of this invention may be subjected to temperature extremes without deleterious effect.

It is therefore an object of the present invention to provide an improved rectilinear potentiometer adapted to be encased in a protective shell, wherein close machining tolerance and accuracy may be maintained in a potentiometer having a length considerably in excess of existing rectilinear potentiometer dimensions.

A further object of the present invention is to provide an improved vibration-proof and shock-proof case for a rectilinear potentiometer.

Yet a further object of the present invention is to provide an improved potentiometer casing which may be rapidly and inexpensively assembled without the use of rivets, nuts, bolts or similar fastening means.

It is still another object of the present invention to provide an improved rectilinear potentiometer suitable for use under conditions of extreme variations in ambient temperature.

It is yet a further object of the present invention to provide means for the rapid dismantling of the device for purposes of testing and servicing, and for rapid reassembling of the said device without utilization of a multiplicity of individual fastening means.

Still a further object of the present invention is to provide casing means readily adapted to be manufactured in varying lengths, without the necessity for expensive retooling and redesign.

Yet a further object of the present invention is to provide an improved precision linear potentiometer, adapted to be manufactured at relatively low cost and with highly simplified assembly means, facilitating rapid and economical assembly of said unit.

These and other objects and advantages of the present invention will be set forth in greater detail in the following description and accompanying drawings, and the claims appended thereto.

In the drawings:

Figure 1 is a perspective view of the components of a potentiometer of the present invention shown in exploded relation.

Figure 2 is a vertical longitudinal view, shown partially in cross-section, and partially broken away, of a device of the present invention.

Figure 3 is a cross-sectional view taken along line 3—3 of Figure 2.

Figure 4 is a cross-sectional view taken along line 4—4 of Figure 2.

Figure 5 is a horizontal cross-sectional view of a portion of the device taken along line 5—5 of Figure 2.

Referring more particularly to the drawings, there is shown in Figure 1 a device of the present invention. Elongated member 12 and elongated member 14, formed of electrically non-conductive materials, are juxtaposed in abutting relation to form an elongated tubular member. Members 12 and 14 are somewhat U-shaped in cross section, as may be seen in Figure 3, and when brought together, a central cavity 18 is thereby defined. Member 12 has an inner wall portion 20 and an outer wall portion 22, and similarly member 14 has an inner wall portion 24 and an outer wall 26. As shown in Figure 1, spaced transverse ridges 28 are formed on outer wall 22 of member 12 and similar ridges 30 are formed on the outer wall 26 of member 14, which register to define transverse continuous ridges. The purpose of these ridges will be explained in greater detail hereinafter.

In the embodiment of the invention presently described a rectilinear potentiometer of the dual track type is described, namely with two resistance paths and two conductive paths employed in the device. It will be appreciated however, that the single type or multiple types can be constructed if desired with no change in the principle of the present invention. For the dual type of construction illustrated, resistance paths 34 and 36 are disposed longitudinally along the inner wall 20 of member 12. Conductive paths 38 and 40 are placed longitudinally in inner wall 24 of member 14. Alternatively, members 12 and 14 could each carry a resistance path and a conductive path. For simplicity in construction and dependability in operation, resistance paths and conductive paths of the conductive plastic type are preferred. The conductive plastic paths are comolded with the plastic insulator base comprising members 12 and 14. However, alternatively, the resistance paths 32 and 34 may be formed of wire-wound or similar resistance material well known in the art, and conductive paths 38 and 40 may be formed of conventional metallic conductor or printed circuit types of conductive paths if desired. This latter type of construction may be advantageously employed for molded ceramic or glass insulators 12 and 14 upon which metallized resistance tracks may be deposited.

As shown in Figure 2, block 42 is provided as a closure plate for casing 16, at one end thereof. As indicated in greater detail in Figure 1, block 42 comprises a cylindrical portion 44 having a stepped rim 46, and a rectangular portion 48 provided with projecting pins 50. Spaced apertures 52 are formed in ridge portion 28 of member 12 and corresponding apertures 52 are formed in ridge portion 30 of member 14, which are disposed to register with and be retained by said pins 50 with these members 12 and 14 are brought into juxtaposed position. In this position, members 12 and 14 are also in close abutting contact with inner end wall 54 of cylindrical portion 44, whereby block 42 is clamped against displacement relative to members 12 and 14. It is to be noted that the inner faces of members 12 and 14 are flat in configuration so as to mate with rectangular portion 48 of block 42. Locking means, to be described in greater detail hereinafter, are provided to keep members 12 and 14 in tight abutting relationship, therefore it will be seen that block 42 will remain clamped in position.

As shown in Figure 3, block 42 is provided with a bushing 59 in which shaft 58 is rotatably mounted. One end 60 of said shaft projects linearly outward of casing 16, while the inner end 62 can be moved linearly in cavity 18. A shoulder 64 is formed near the outer portion of the shaft to limit the amount of inward axial movement.

Brush block 66 is mounted on shaft 58, which is rotatable in a bore formed in said brush block. The brush block is retained on the shaft by a spring loaded washer (not shown) which exerts pressure against one side of the block, and washer 68 which is maintained in abutting relationship to the other side of the block by a second washer 69 which is keyed to rotate with shaft 58. Lock nut 70 retains washers 68 and 69 on the shaft. Block 66 is thus retained against axial displacement relative to the shaft, and end play is eliminated.

As shown in Figure 4, a longitudinal track 72 is formed in the inner wall of members 12 and 14 to comprise a guide channel in which end portion 76—76 of brush holder 66 can slidingly travel, thereby any rotary or transverse displacement of this brush holder relative to casing 16 is avoided. As shown in Figures 3 and 4, track 72 is defined by longitudinal ledge 73 formed on member 12 which registers with portion 74 of member 14, when members 12 and 14 are in the juxtaposed position, to form said track 72.

In the present embodiment of the device, for operation as a dual type rectilinear potentiometer as previously described, two brush elements are required, namely brush 78—78 which simultaneously wipes resistance path 36 and conductive path 38, electrically connecting these paths, and brush 80—80 which simultaneously wipes resistance path 34 and conductive path 40, electrically connecting these two latter elements. As shown in Figure 1, taken in conjunction with Figures 2 and 3, brushes 78 and 80 are each comprised of a pair of resilient contact arms, each arm having a low resistance wiper tip 82, formed as a half-round member of a precious metal alloy such as platinum-palladium. External leads 83 are brought into electrical connection with the individual resistance and conductive paths through apertures 81, through the external walls of members 12 and 14. The leads are then soldered in place within the housing, to an appropriate number of terminal means 84 carried by members 12 and 13 which are connected by suitable conductors to the resistance and conductive paths.

As shown in Figure 1, a tubular shell 16 serves as an exterior protective housing for the device, and simultaneously serves as a locking means securely and rigidly maintaining elongated members 12 and 14, together with closure plate 42, in proper spaced relationship to each other. Tubular shell 16 is a simple metal tube, which may be procured as a semi-finished stock item with normal manufacturing tolerances, at a substantially lower cost than the specially machined close tolerance housing employed in the conventional precision potentiometer, which requires a specially machined housing member. Stainless steel is a preferred material for shell 16 where corrosion problems exist. Aluminum or still other materials may be employed where weight and/or cost considerations are a factor.

Tube 16 is provided with an opening 86 at one end, the other end having openings 104 through which leads 83 are brought out. The inner diameter of the shell is dimensioned so as to register in close abutment with cylindrical portion 44 of block 42, during final assembly of the unit. The body portion of the shell has formed thereon a series of annular grooves 88 which serve to pinch in or compress the inner wall of the shell at these points. These grooves are readily produced on a lathe by a rolling operation. These grooves are arranged in spaced relationship on the shell so that in final assembly the said grooves will register with ridges 28 and 30 of members 12 and 14, respectively, as shown more clearly in Figure 3. In order to provide a tight fit, a simple reaming operation is performed on the inside of the shell to machine the grooves to the desired size. It will be understood that ridges 28 and 30 formed on elongated members 12 and 14 can be molded with close tolerances, and also can be machined by grinding to a precise dimension if desired.

By comparing the cross-sectional views of Figures 3, 4 and 5 it will become apparent that the members 12 and 14 are seized by the outer casing 16 only at the points wherein there is provided ridges 28 and 30.

Thus the machining and sizing operations necessary to produce the device of the present invention have been restricted to limited portions of the device and the necessity for machining the entire length of the potentiometer casing has been avoided. If the entire length were machined, as is commonly the case with existing devices, the cost would be substantially increased. Furthermore, extremely accurate tolerances are necessary where such elaborate machining takes place, to permit assembly without binding. Thus in practice the length of rectilinear potentiometers of this type is no longer restricted by practical machining limitations. It is a major advantage of the present invention that units of relatively long length may be accurately and economically manufactured.

In assembly, the members 12 and 14 are juxtaposed over the closure plate 42 by means of guide pins 50, and the device is introduced into shell 16 to form a spaced assembly wherein grooves 88 press tightly upon the ridges 32, and end portion 90 of the shell fits closely about cylindrical portion 44 of the closure plate 42, and abuts against rim 46. Set screws 92 are provided for openings 94 in shell 16, which register with threaded apertures 96 in cylindrical portion 44, these screws are inserted in the registering openings to prevent rotation of the shell, and also to orient the shell with reference to the terminal leads 83 disposed on members 12 and 14. A longitudinal channel 98 is formed on outer wall 22 of member 12, similarly channel 100 is formed on outer wall 26 of member 14, to provide a recessed area for positioning leads 83, whereby these leads are not compressed between the outer wall of members 12 and 14 and the inner wall of shell 16. Openings 104 are formed in the sealed end wall 106 of the tubular shell, through which terminal leads 83 may be drawn out. These leads may be potted in the respective channels 98 and 100, by epoxy resin 105, as indicated in Figure 1.

Shell 16 may be provided with flanges or mounting lugs, or if desired, with a thread cap portion 107, as shown in Figure 1. Optionally, a flat 108 may be formed in shell 16, as a means for grasping the unit with a tool when mounting the device.

It should be noted that as shown in Figure 2, ample clearance is provided between the inner ends of casing members 12 and 14, and end wall 106. Thus, unequal axial rates of expansion of non-metal casing members 12 and 14 as compared to metallic shell 16 cannot result in any binding or distortion of the components. This provision for expansion due to high temperatures is of great importance, since in general, existing devices permanently lock plastic components to metallic shielding elements whereby error and malfunctioning of the apparatus could result in the course of expansion caused by temperatures.

For purposes of testing, members 12 and 14 may be joined to block 42 as previously described, and held together by a temporary fastening means such as a strip of pressure sensitive adhesive tape, and the device then subjected to the necessary tests. In the event that a correction or adjustment is necessary the two portions 12 and 14 may readily be separated by removing the adhesive tape.

It should also be noted that the assemblage of the device of the present invention has been accomplished without the necessity for rivets, bolts or other permanent fastening means. This permits of rapid economical assembly and also of simple dismantling of the unit for maintenance and repair, without the necessity of complex time-consuming and costly dismantling procedure.

It has been found adequate to provide sets of ridges and grooves approximately 3½" apart, although this spacing is not critical. It is preferred that at the ends of the elements there be ridges for increased strength as for example, where openings 52 are provided to receive pins 50.

Furthermore, it will readily be appreciated that the device of the present invention can be manufactured in a variety of lengths, including long lengths of 30 inches or more which are difficult or impossible to make using the conventional manufacturing and assemblage methods now in use. There has thus been provided, in accordance with the present invention, a simple low cost precision potentiometer furnished with a protective metallic casing and having characteristics of utility and adaptability not found in devices currently in use.

Various changes and modifications in the device of the present invention may be made by those skilled in the art, without, however, departing from the spirit and scope of this invention.

What is claimed is:

1. A potentiometer including a resistance element, a contact adapted to variably engage said resistance element, externally actuatable means to move said contact along said resistance element, and means to electrically connect said resistance element and said contact with an external circuit, wherein said potentiometer includes an electrically non-conductive tubular member comprising a first elongated member and a second elongated member, each of said members being generally U-shaped in cross section and having an inner wall and an outer wall portion, the said members being adapted to abut each other in complementary mating relationship to define said tubular member, the said inner walls of said tubular member defining a cavity with said resistance path being formed longitudinally on the said inner wall of one of said elongated members, a tubular outer shell, a plurality of annular ridges formed on the inner wall of said shell to define a reduced diameter for said shell at said ridges, a plurality of transverse ridges formed in spaced relation on said outer wall of said first and said second elongated members adapted to register and define ridges for said tubular member when said members are in said complementary mating relationship, said shell being dimensioned whereby said tubular member can be inserted into said shell and be enclosed therein, the said annular ridges formed on the inner wall of said shell being in tight abutting relationship with the said external ridges formed on said tubular member to compress the said first and said second elongated members together in tight abutting relationship.

2. A device as in claim 1, wherein there is provided a closure block adapted to mate with the said inner walls of said tubular member, projecting pins extending from said closure block, and wherein the said elongated members have spaced apertures formed in the respective end portions thereof adapted to receive said projecting pins when said first and said second elongated members are in spaced abutting relationship with said block, the said block thereby being securely clamped against movement relative to said first and said second elongated members.

3. In a potentiometer, a tubular member comprising a first elongated insulator member and a second elongated insulator member, each of said elongated members being generally U-shaped in cross-section and having an inner wall and an outer wall portion, the said elongated members being adapted to abut each other in complementary mating relationship to define said tubular member, the said inner walls of said tubular member defining a cavity, at least one resistance member formed longitudinally on the said inner wall of one of said members, a block having an axial bore therethrough, means formed on adjacent end portions of said first and said second members adapted to abut and retain said block transversely between said members to define a closure wall for said tubular member when said elongated members are in said complementary mating relationship, a shaft rotatably mounted in said axial bore, the said shaft having an outer end protruding from said casing, and an inner end disposed in said cavity of said tubular member, a brush holder mounted on said shaft proximate to said inner end of said shaft, means mounted on said shaft abutting said brush holder to constrain said brush holder against axial movement relative to said shaft, brush means carried by said brush holder and adapted to wipe said resistance member, as said shaft is moved rectilinearly, means to electrically connect said resistance member and said brush means to external circuits, an elongated cylindrical shell open at one end closed at the other end to define a longitudinal cavity, a plurality of annular ridges formed on the inner wall of said shell to define a reduced diameter for said shell at said ridges, a plurality of transverse ridges formed in spaced relation on said outer wall of said first and said second elongated members adapted to register and define ridges for said tubular member when said members are in said complementary mating relationship, said shell being dimensioned whereby said tubular member can be inserted into said longitudinal cavity in said shell and be enclosed therein, the said annular ridges formed on the inner wall of said shell being in tight abutting relationship with the said external ridges formed on said tubular member to compress the said first and said second elongated members together in tight abutting relationship.

4. A device as in claim 3, wherein said closure block is provided with a plurality of projecting pins, the said elongated members having spaced apertures formed in the respective end portions thereof adapted to receive said projecting pins when said first and said second elongated members are in spaced abutting relationship with said block, the said block thereby being securely clamped against movement relative to said first and said second members.

5. A device as in claim 3, wherein said means for making connection to external circuits include in combination, a longitudinal channel formed in the said outer wall of said first elongated member, and a second longitudinal channel formed in said outer wall of said second elongated member, said channels registering with openings formed in the wall of said cylindrical shell, apertures formed in the walls of said first and second elongated members, individual connector means formed in said inner walls proximate to and in electrical connection with said resistance path and said brush means and a plurality of electrically conductive leads positioned in said channels with one end of said leads in electrical connection with said connector means, the other end of said leads being extended through said openings in said cylindrical shell.

6. A device as in claim 3, wherein said cylindrical shell is provided with a threaded cap portion.

7. In a potentiometer, an elongated tubular member comprising a first elongated member and a second elongated member, each of said members being generally U-shaped in cross-section and having an inner wall and an outer wall portion, the said members being adapted to abut each other in complementary mating relationship to define said elongated tubular member, the said inner walls defining an axial cavity; at least one resistance path formed longitudinally on the said inner wall of one of said members, at least one conductive path formed longitudinally on the said inner wall of one of said members, the number of said conductive paths equalling the number of said resistance paths; a block having an axial bore therethrough; means formed on adjacent end portions of said first and said second members adapted to abut and retain said block transversely between said members to define a closure wall for said tubular member when said elongated members are in said complementary mating relationship; a shaft rotatably mounted in said axial bore, the said shaft having an outer end protruding linearly from said tubular member, and an inner end linearly disposed in said axial cavity of said tubular member; a brush holder mounted on said shaft proximate to said inner end of said shaft; means mounted on said shaft abutting said brush holder to constrain said holder against axial movement relative to said shaft; guide means formed longitudinally on the said inner walls of said first and second elongated members abutting said brush holder and constraining said holder against transverse and rotational movement relative to said tubular member when said elongated members are in juxtaposition; brush means carried by said block and adapted to wipe both said resistive path and said conductive path and to electrically connect said paths, in pairs consisting of one said resistive path and one said conductive path, terminal connections formed on said tubular member in electrical connection with said resistance paths and said conductive paths; a plurality of transverse ridges formed in spaced relation on the said outer wall of said first and said second elongated members, adapted to register and define ridges for said tubular member, when said elongated members are in juxtaposed position; an elongated cylindrical shell open at one end and sealed at the other end to define a longitudinal cavity; a plurality of annular ridges formed on the inner wall of said shell to define a reduced diameter for said shell at said ridges, said shell being dimensioned whereby said tubular member can be inserted into said longitudinal cavity in said shell and be enclosed therein, the said ridges formed on the inner wall of said shell being in tight abutting relationship with the said external ridges formed on said tubular member to compress the said first and said second elongated members together in tight abutting relationship; the said block thereby being securely locked and constrained against movement relative to said first and second members.

8. A device as in claim 7 wherein said closure block includes a plurality of projecting pins, the elongated members having spaced apertures formed in the respective end portions thereof adapted to register with said projecting pins when said first and said second elongated members are in spaced abutting relationship with said block, said block thereby being securely retained and constrained against movement relative to said first and said second elongated members, the said open end portion of said cylindrical shell being adapted to register in tight abutting relationship with said cylindrical portion of said block.

References Cited in the file of this patent
UNITED STATES PATENTS

| | | |
|---|---|---|
| 2,704,800 | Graybeal et al. | Mar. 22, 1955 |
| 2,769,073 | Gintovt | Oct. 30, 1956 |
| 2,777,926 | Bourns | Jan. 15, 1957 |
| 2,790,052 | Armstrong | Apr. 23, 1957 |